(12) United States Patent
Tsuruta et al.

(10) Patent No.: US 6,306,190 B1
(45) Date of Patent: Oct. 23, 2001

(54) SECONDARY AIR SUPPLY DEVICE

(75) Inventors: Yuichiro Tsuruta; Nobuhiro Kasai; Masayoshi Kobayashi, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/392,296

(22) Filed: Sep. 8, 1999

(30) Foreign Application Priority Data

Sep. 8, 1998 (JP) .................................................. 10-253837

(51) Int. Cl.[7] ...................................................... B01D 50/00
(52) U.S. Cl. ...................... 55/385.3; 55/484; 55/DIG. 28; 123/198 E; 60/282; 60/304
(58) Field of Search ................................ 55/350.1, 385.3, 55/417, 484, 529, DIG. 28, DIG. 30; 95/273, 286; 123/198 E; 60/282, 293, 304; 180/313

(56) References Cited

U.S. PATENT DOCUMENTS

| 4,083,184 | * | 4/1978 | Ushijima et al. .................... 55/385.3 |
| 4,134,263 | * | 1/1979 | Matsumoto et al. .................... 60/293 |
| 4,179,883 | * | 12/1979 | Nishiyama et al. .................... 60/293 |
| 4,215,542 | * | 8/1980 | Kobayashi et al. .................... 60/293 |
| 4,236,901 | * | 12/1980 | Kato et al. ............................ 55/484 |
| 4,262,783 | * | 4/1981 | Scarrott et al. ....................... 477/94 |
| 4,319,549 | * | 3/1982 | Yoneda et al. ................... 123/198 E |
| 5,442,911 | * | 8/1995 | Hirsch .................................... 60/293 |
| 5,657,628 | * | 8/1997 | Takeuchi .............................. 60/293 |

FOREIGN PATENT DOCUMENTS

| U6180310 | 5/1986 | (JP) . |
| 56148 | 1/1993 | (JP) . |

* cited by examiner

Primary Examiner—Duane Smith
Assistant Examiner—Jason M. Greene
(74) Attorney, Agent, or Firm—Birch, Stewart, Kolasch & Birch, LLP

(57) ABSTRACT

An air cleaning system for an engine includes a main air cleaner for supplying cleaned air to an intake system of the engine and a sub-air cleaner for supplying cleaned air to an exhaust system of the engine. The main air cleaner includes a main air cleaner housing divided into a dirty air chamber and a clean air chamber by a first air cleaning element. The sub-air cleaner is disposed in the dirty air chamber, and has its own second air cleaning element, physically separated from the first air cleaning element.

16 Claims, 3 Drawing Sheets

SECONDARY AIR SUPPLY DEVICE

BACKGROUND OF THE INVENTION

1. Field of the Invention

The present invention relates to a secondary air supply device, incorporated into an intake air cleaner of a vehicle's engine, for supplying secondary air into an exhaust system of the engine.

2. Background Art

Japanese Utility Model Laid-open No. Hei 5-6148 discloses a secondary air supply device disposed inside of a main air cleaner's case, hereinafter referred to as a main case. The main air cleaner is divided into a dirty side and a clean side by an air cleaner element, hereinafter referred to as a main element. The secondary air supply device is formed as a small region, or part, of the main element located on the clean side.

Japanese Utility Model Laid-open No. Sho. 61-80310 discloses a secondary air supply device in which an inlet of a sub-air cleaner is provided inside the clean side of the main air cleaner. The sub-air cleaner uses the main case and the main element.

In the structure disclosed in Japanese Utility laid-open No. Sho. 61-80310, since both the main air cleaner and the sub-air cleaner use the clean side, the sub-air cleaner must be kept away from the influence of negative pressure caused by air intake of a carburetor of the engine. Therefore, the sub-air cleaner must be positioned away from the intake inlet of the carburetor on the clean side. This results in the clean side being required to have a large capacity, which reduces design freedom.

In the structure disclosed in Japanese Utility Laid-open No. Hei 5-6148, the negative pressure influence due to the carburetor's intake is avoided. However, the shape of the main element must be adapted to accommodate the secondary air supply device. Therefore, the possible structural configurations of the main element are limited, and it is difficult to use a generally cylinder type of main element.

SUMMARY OF THE INVENTION

The present invention has as an object to solve one or more of the drawbacks described in relation to the background art.

The present invention has as an additional object to provide a secondary air supply device, which allows design freedom of the clean air chamber, or clean side, of the main air cleaner.

The present invention has as an additional object to provide a secondary air supply device, which allows design freedom of the main element of the main air cleaner.

The present invention has as an additional object to provide a secondary air supply device, which is less susceptible to invasion by water or dirt.

The present invention has as an additional object to provide a secondary air supply device, which has a reduced number of parts, and which is simple to manufacture, install, and maintain.

These and other objects of the invention are accomplished by providing an air cleaner for an engine comprising: a main air cleaner housing; a first air cleaning element disposed within said main air cleaner housing, dividing said main air cleaner housing into a dirty air chamber and a clean air chamber, an intake port formed in said main air cleaner housing communicating with said dirty air chamber; an outtake port formed in said main air cleaner housing communicating with said clean air chamber for supplying cleaned air to an intake system of the engine; and a sub-air cleaner provided in said dirty air chamber, physically separated from said first air cleaning element, for supplying cleaned air to an exhaust system of the engine.

Further, these and other objects of the invention are accomplished by providing a vehicle comprising: an engine having an intake system and an exhaust system; a main air cleaner for supplying cleaned air to said intake system, said main air cleaner including: a main air cleaner housing; a first air cleaning element disposed within said main air cleaner housing, dividing said main air cleaner housing into a dirty air chamber and a clean air chamber; an intake port formed in said main air cleaner housing communicating with said dirty air chamber; and an outtake port formed in said main air cleaner housing communicating with said clean air chamber supplying cleaned air to said intake system of said engine; and a sub-air cleaner for supplying cleaned air to said exhaust system, wherein said sub-air cleaner is provided in said dirty air chamber, physically separated from said first air cleaning element.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
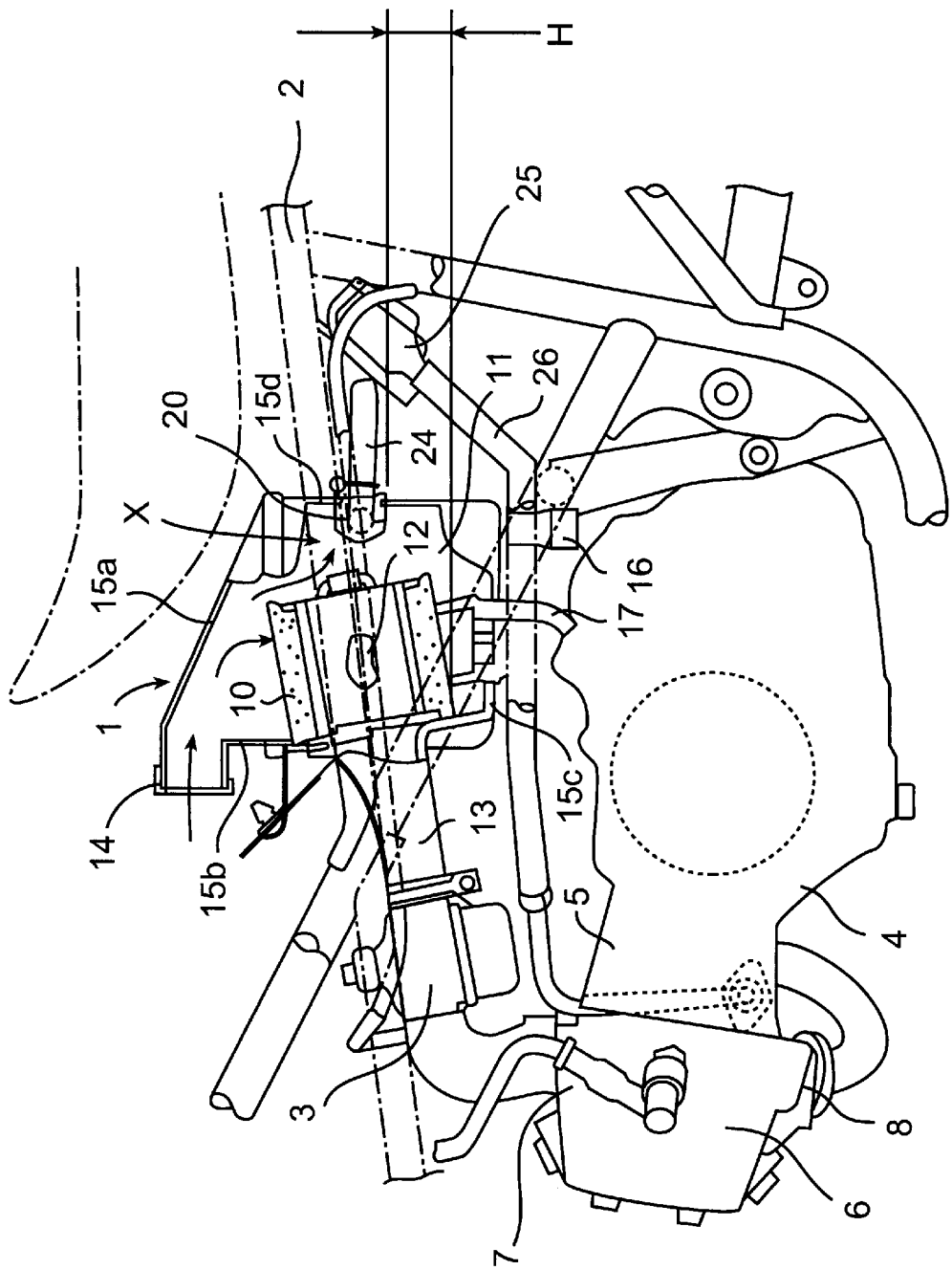
FIG. 1 is a cross sectional side view illustrating a main air cleaner, in accordance with the present invention, installed in a vehicle.
Figure 2:
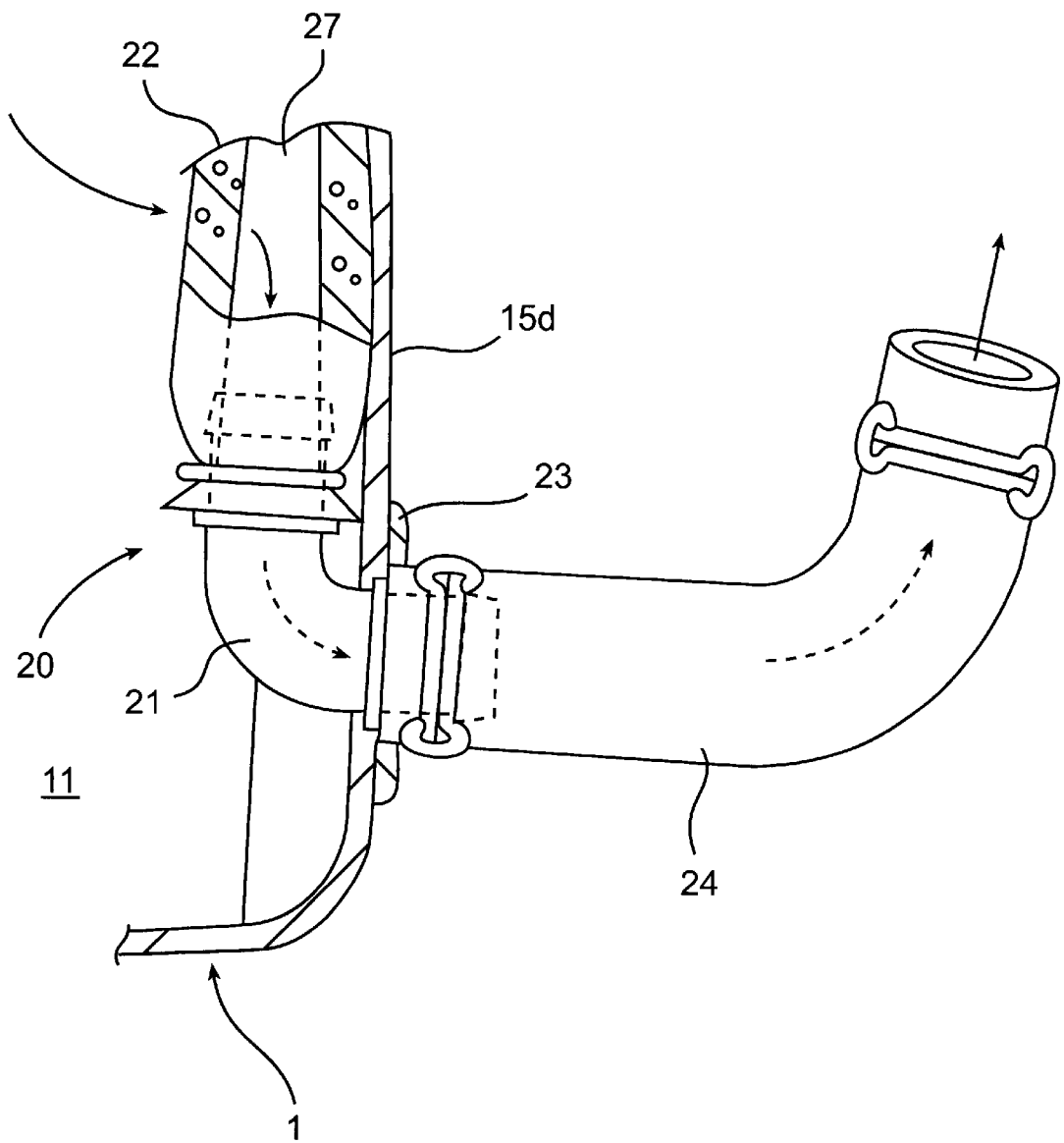
FIG. 2 is a cross sectional top view illustrating a sub-air cleaner of the main air cleaner viewed from the arrow X in FIG. 1.

FIGS. 1 and 2 illustrate a sub-air cleaner 20 for use with a vehicle, such as a buggy car. In FIG. 1, a main case 1 of a main air cleaner is arranged at the center of the vehicle. The main case 1 is supported by a pair of main frames 2, which are arranged in the front-rear direction of the vehicle. One each of the pair of main frames 2 are provided on the right and left sides of the vehicle, respectively.

The main case 1 is connected via a carburetor 3 to an engine 4. The engine 4 is supported below the main frame 2 with a cylinder part 5 thereof lying toward a front of the vehicle. An intake port 7 and an exhaust port 8 are provided on a cylinder head 6 of the engine 4.

The intake port 7 is provided on an upper part of the cylinder head 6 and connected on a downstream side of the carburetor 3. The exhaust port 8 is connected to an exhaust pipe provided below the exhaust port 8.

The main air cleaner supplies cleaned air into the intake port 7 of the engine 4. The inside of the main case 1 is divided into a dirty air chamber, or dirty side 11, and a clean air chamber, or clean side 12, by a cylindrical main element 10. The dirty side 11 is outside of the cylindrical main element 10, and the clean side 12 is inside of the cylindrical main element 10. The clean side 12 is connected via a connecting tube 13 to an upstream side of the carburetor 3.

The dirty side 11 is supplied with fresh air via an intake duct 14 formed on a front upper part of the main case 1. A snorkel would be connected to the intake duct 14, and would extend to a front upper part of the vehicle. The fresh air supplied via the intake duct 14, into the dirty side 11, is refined, or cleaned, by the main element 10. The refined air is sent into the clean side 12, and then on further to the carburetor 3.

The main case 1 is defined by a ceiling wall 15a, a front wall 15b, a base wall 15c, and a rear wall 15d. Intake openings for the intake duct 14 and the connecting tube 13 are formed on the front wall 15b. A drainpipe 16 and a breather tube 17 extend downward from the base wall 15c.

The sub-air cleaner 20 is provided in the vicinity of the rear wall 15d on the dirty side 11 of the main case 1. The sub-air cleaner 20 includes a substantially L-shaped pipe 21 and a second air cleaning element, in the form of a filter 22. The filter 22 is attached to a circumference of a tip end of the pipe 21. As illustrated in FIG. 2, the pipe 21 is supported via a cushioning rubber 23 toward the rear wall 15d.

The tip end of the pipe 21 projects from the rear wall 15d to the outside of the main case 1. The tip end is connected, via a hose 24, to an intake side of a boss, or intake bulge 25. An exhaust side of the intake bulge 25 is then connected to the exhaust port 8, or exhaust system generally, via a hose 26 to supply secondary air to the exhaust port 8 for refining the air exhausted by the engine.

As shown in FIG. 2, the pipe 21 is arranged such that the opening end thereof, in the dirty side 11, is directed in the vehicle width direction. The filter 22 is attached to this opening end.

The filter 22 is a known member formed of porous sponge, or the like. The filter 22 has a cylinder shape with a base. An interior space 27 of the filter 22 constitutes a secondary clean room communicating with the pipe 21.

In operation, fresh air supplied from the intake duct 14 to the dirty side 11 is refined, or cleaned, via the filter 22. The refined air passes through the space 27 and is supplied to the pipe 21, to the hose 24, to the intake bulge 25, to the hose 26, and then on to the exhaust port 8. As illustrated in FIG. 1, the sub-air cleaner 20 is installed inside the main case 1 at a point higher than the lowest part of the main element 10 by a dimension H.

Next, operation of the sub-air cleaner 20 will be described. A part of the fresh air, supplied via the intake duct 14 into the dirty side 11, is supplied to the sub-air cleaner 20. Because the sub-air cleaner 20 is installed on the rear wall 15d, adjacent to a first end of the cylindrical main element 10, outside the cylindrical main element 10, and inside a circular perimeter defined by an extension direction of the cylindrical main element 10 (as illustrated in FIG. 1), the sub-air cleaner 20 is installed sufficiently far away from the main element 10. Therefore, the sub-air cleaner 20 is kept away from the influence due to intake of air by the engine.

It is important to note that the sub-air cleaner 20 is not provided in the clean side 12. Therefore, the capacity of the clean side 12 need not accommodate the sub-air cleaner 20, which means that the clean side 12 can be matched to the intake requirements of the engine and made relatively more compact. Moreover, the sub-air cleaner 20 does not limit the shape of the main element 10, since the sub-air cleaner 20 has its own filter 22. The main element can be of a common cylinder type, or of any desired type. This increases the design freedom. Also, by providing the sub-air cleaner 20 with its own filter 22, the sub-air cleaner 20 can be repaired independently of the main air cleaner, e.g. the filter 22 can be replaced without having to replace the more costly main element 10.

It is important to note that the sub-air cleaner 20 is arranged at a position higher, i.e. by a dimension H, than the lowest part of the main element 10. Should water or dirt invade into the inside of the dirty side 11 via the connection part of the intake duct 14 or the main case 1, the invaded water or dirt will not invade into the sub-air cleaner 20 before it invades into the main element 10. This increases the resistance of the sub-air cleaner 20 against invasion of water or dirt. This is particularly advantageous in the case of a buggy car or motorcycle which, because of the nature of its use, is highly likely to be invaded by water or dirt due to driving on rough roads or paths.

Further, since the main case 1 also serves as the case of the sub-air cleaner 20, a dedicated case for the sub-air cleaner 20 can be omitted. As a result, the number of parts in the overall air cleaner system can be reduced.

Figure 3:
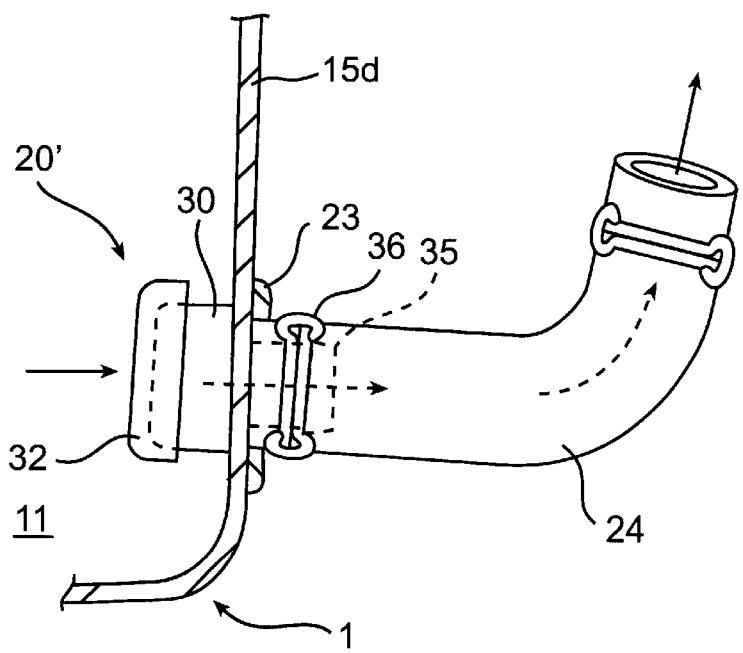
FIG. 3 is a cross sectional top view illustrating a sub-air cleaner according to an alternative embodiment of the present invention.
Figure 4:
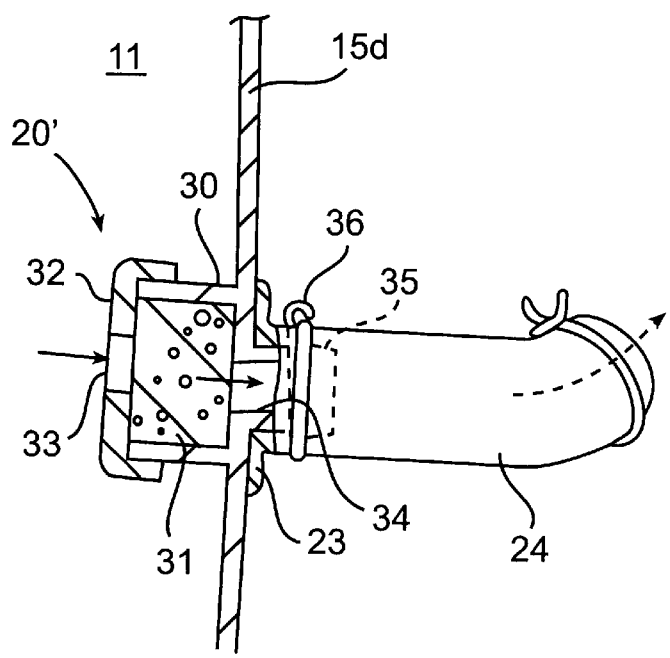
FIG. 4 is a cross sectional side view illustrating the sub-air cleaner of FIG. 3.

Next, an alternative embodiment will be described with reference to FIGS. 3 and 4. FIG. 3 shows a sub-air cleaner 20' in cross section, viewed from the same direction as in FIG. 2. FIG. 4 shows the sub-air cleaner 20' in cross section, viewed from the side of the vehicle, in other words, in the same direction as in FIG. 1. Parts, which are the same as those illustrated in FIGS. 1 and 2, are given identical reference numerals.

In this alternative embodiment, the case 30 of the sub-air cleaner 20 protrudes toward the inside of the dirty side 11. The case 30 is integrally formed with the rear wall 15d, and opens in the lateral direction, i.e., toward the side opposing to the main element 10.

A filter 31 is fitted inside of the case 30 via the opening. A cap 32 covers the opening from the front side and is sealed on the surrounding parts of the case 30. The cap 32 also has an opening in the lateral direction.

An exhaust opening 34 is formed on the rear wall 15d, surrounded by the case 30. A joint pipe 35 protrudes backward from the rear wall 15d at the exhaust opening 34. One end of the hose 24 is connected to the protruded joint pipe 35 and fixed by a clip wire 36.

With the above arrangement, the supporting part of the filter 31, e.g. the case 30, is integrally formed with the rear wall 15d. Therefore, the number of parts is reduced. In addition, when the sub-air cleaner 20' is set such that its opening is directed in the lateral direction, no opening is formed in the upward direction, as is illustrated in FIG. 4. Therefore, water or dirt invading from above can be more reliably prevented from passing into the sub-air cleaner 20'. This can further improve the sub-air cleaner's resistance to the invasion of water or dirt.

It should be noted that the present invention is not limited to the above embodiment, and can be modified in various ways. For example, the installation position of the sub-air cleaner 20 or 20' is not limited to the vicinity of the rear wall 15d. In fact, the sub-air cleaner 20 or 20' could be located at any position, except the base wall 15c, which is free from the influence of negative intake pressure of the engine, such as in the vicinity of the ceiling wall 15*a*. Also, the present invention is applicable not only to buggy cars, but also to various other types of vehicles, such as motorcycles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air cleaner for an engine comprising:
   a main air cleaner housing;
   a first air cleaning element disposed within said main air cleaner housing, dividing said main air cleaner housing into a dirty air chamber and a clean air chamber;
   an intake port formed in said main air cleaner housing communicating with said dirty air chamber;
   an outtake port formed in said main air cleaner housing communicating with said clean air chamber for supplying cleaned air to an intake system of the engine; and
   a sub-air cleaner provided in said dirty air chamber, said sub-air cleaner including a second air cleaning element physically separated from said first air cleaning element for supplying cleaned air to an exhaust system of the engine, wherein said first air cleaning element has a cylindrical filtering element with a first end and a second end, and wherein said second air cleaning element is disposed adjacent to said first end.

2. The air cleaner according to claim 1, wherein said dirty air chamber is located outside said cylindrical filtering element and said clean air chamber is located inside said cylindrical filtering element.

3. The air cleaner according to claim 1, wherein said sub-air cleaner includes a casing which is integrally formed with said main air cleaner housing.

4. The air cleaner according to claim 1, wherein said sub-air cleaner includes a casing which is attached to said main air cleaner housing.

5. The air cleaner according to claim 1, wherein said sub-air cleaner is elevated relative to a lowest part of said first air cleaning element.

6. A vehicle comprising:
   an engine having an intake system and an exhaust system;
   a main air cleaner for supplying cleaned air to said intake system, said main air cleaner including:
      a main air cleaner housing;
      a first air cleaning element disposed within said main air cleaner housing, dividing said main air cleaner housing into a dirty air chamber and a clean air chamber;
      an intake port formed in said main air cleaner housing communicating with said dirty air chamber; and
      an outtake port formed in said main air cleaner housing communicating with said clean air chamber supplying cleaned air to said intake system of said engine; and
   a sub-air cleaner provided in said dirty air chamber, said sub-air cleaner including a second air cleaning element physically separated from said first air cleaning element for supplying cleaned air to an exhaust system of the engine, wherein said first air cleaning element has a cylindrical filtering element with a first end and a second end, and wherein said second air cleaning element is disposed adjacent to said first end.

7. The vehicle according to claim 6, wherein said intake system includes a carburetor connected to said outtake port.

8. The vehicle according to claim 6, wherein said sub-air cleaner includes an opening inside said dirty air chamber directed in a direction approximately perpendicular to a travel direction of said vehicle.

9. The vehicle according to claim 8, wherein said opening is covered by said second air cleaning element.

10. The vehicle according to claim 6, wherein said vehicle is a four-wheeled buggy.

11. The vehicle according to claim 6, wherein said vehicle is a motorcycle.

12. The vehicle according to claim 6, wherein said second air cleaning element is elevated relative to a lowest part of said first air cleaning element.

13. The vehicle according to claim 6, wherein said dirty air chamber is located outside said cylindrical filtering element and said clean air chamber is located inside said cylindrical filtering element.

14. The vehicle according to claim 6, wherein said sub-air cleaner includes a casing which is integrally formed with said main air cleaner housing.

15. The air cleaner according to claim 1, wherein said second air cleaning element is disposed adjacent to said first end, outside said cylindrical filtering element, and inside a circular perimeter defined by an extension direction of said cylindrical filtering element.

16. The vehicle according to claim 6, wherein said second air cleaning element is disposed adjacent to said first end, outside said cylindrical filtering element, and inside a circular perimeter defined by an extension direction of said cylindrical filtering element.

* * * * *